(No Model.)
A. HAID.
GALVANIC BATTERY.
No. 286,809.  Patented Oct. 16, 1883.
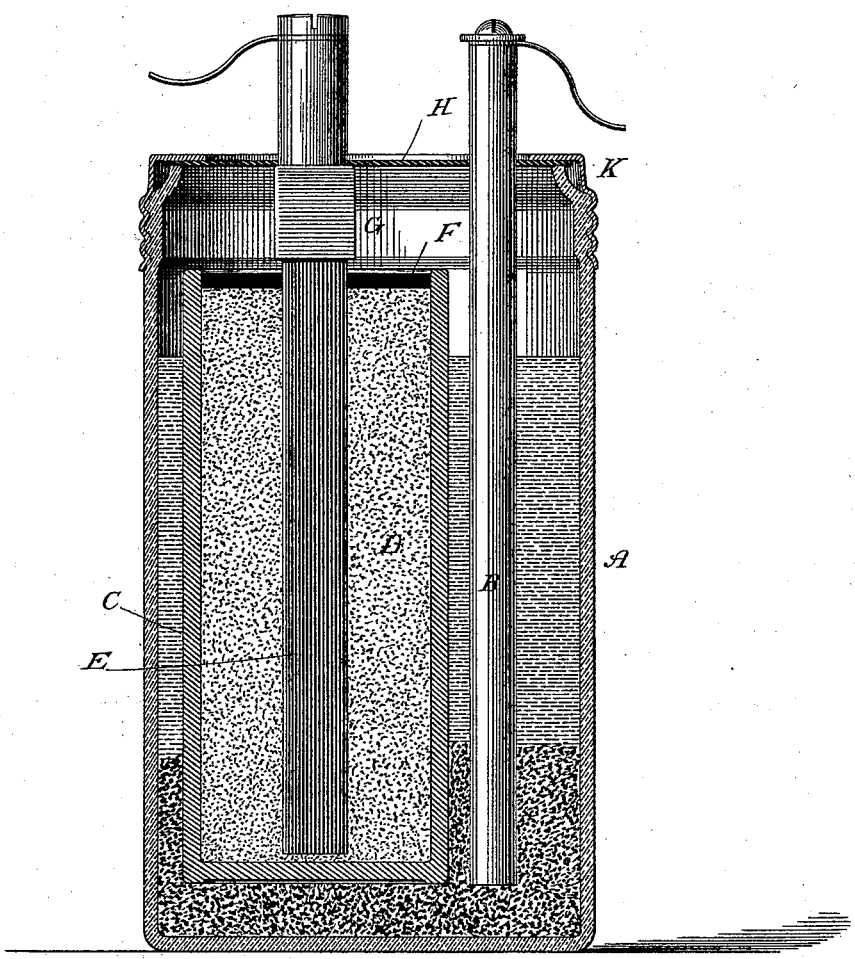
Attest:
Raymond F. Barnes.
W. H. Doggett.
Inventor:
Alfred Haid,
By Parker W. Page
Atty.

UNITED STATES PATENT OFFICE.

ALFRED HAID, OF RAHWAY, NEW JERSEY.

GALVANIC BATTERY.

SPECIFICATION forming part of Letters Patent No. 286,809, dated October 16, 1883.

Application filed July 30, 1883. (No model.)

*To all whom it may concern:*

Be it known that I, ALFRED HAID, a subject of the Emperor of Germany, and a resident of Rahway, Union county, New Jersey, have invented certain new and useful Improvements in Galvanic Batteries, of which the following is a specification, reference being had to the drawing accompanying and forming a part of the same.

My present invention relates to galvanic batteries; and its object is mainly to obtain a battery which combines, with a capacity for producing a high electro-motive force, great constancy, small size, and portability. This I accomplish by using, in conjunction with a positive electrode and a proper solution, a compound negative electrode of novel character, the nature and method of preparation of which I will now describe.

The negative electrode is contained in a porous cup or jar of any ordinary character, and it consists of a carbon conductor surrounded by and embedded in a mixture of carbon and a depolarizing substance insoluble in the liquid of the battery in a solid and compact mass. I prepare this electrode in the following manner: A depolarizing substance that is not only itself insoluble, or practically so, in the liquid of the battery, but of which the products of decomposition are also insoluble, is intimately mixed with powdered carbon. This mixture is then moistened with dilute acid or other menstruum, which, being absorbed by the depolarizing substance, causes the particles of the mixture to cohere and form a compact mass. While moist the mixture is formed or applied around a carbon conductor, preferably by being placed in an ordinary porous cup containing the carbon, where it rapidly dries and hardens, forming a compact and solid mass. The depolarizing agent which I prefer to use is mercuric oxide or the red precipitate of commerce, though other substances—such as the sesquioxide of iron—may be used. The proportions of carbon and oxide may be obviously varied. I have used seventy-five per cent., by weight, of carbon to twenty-five per cent. of red oxide with good results; but as I have found that the energy and durability of the battery is increased by a larger proportion of oxide, I prefer to use about equal parts, by weight, of the two substances. The carbon may be powdered or granulated and in any of the forms commonly used in batteries of this kind. The agent which I prefer to use for solidifying or compacting the mixture of the two substances is nitric or chromic acid, particularly the former, for the reason, mainly, that together with the water it does not form an acid salt, but an insoluble basic salt and free acid, the result of which is that the zinc electrode is not attacked by the products of decomposition finding their way through the porous cup. When dilute nitric acid is added to a mixture of mercuric oxide and carbon, the acid, combining with the oxide, forms a basic salt of mercury; but by the great excess of oxide present the acid is rapidly absorbed, leaving the particles of the mixture firmly cemented together, the whole mass being compact and dense, but at the same time porous—an extremely desirable condition, and one presenting great advantages over those forms of battery in which the depolarizing substance is in loose grains, or where it is solidified by pressure, so that the action is mainly confined to the surface of the mass.

From the effects produced on the oxide of mercury by the nitric acid, it is evident that other solvents may be used, such as nitrate of mercury or any solutions of metallic compounds that cause the particles to cohere and form a compact mass without cavities or breaks.

In lieu of adding the acids to the mixture of oxide and carbon before it is formed about the carbon conductor, I may fill in the spaces around the carbon rod or plate in the porous cup with the dry mixture and solidify the same by immersing the cup in dilute acid and allowing it to permeate through.

The mechanical construction of the batteries may be greatly varied.

In the accompanying drawing I have illustrated a useful and convenient form, the elements and jars being shown in central vertical section.

A designates the outer cell or jar; B, the zinc electrode; C, the porous cup; D, the compacted mixture of red oxide and carbon, and E the carbon rod or plate. The porous cup C, after being filled with the carbon E and the depolarizing mixture D, is closed with pitch, wax, or a similar substance, F, through which projects a post, G, embedded in the carbon E, and provided with means for connection with a wire. H is a flexible cover with perforations, through which extend the post G and the zinc cylinder B. K is a screw-ring that is applied to the orifice of the jar over the cover H, thus sealing the cell and preventing evaporation or spilling.

For exciting the battery I use a solution of sal-ammoniac, which is poured into the outer jar. The action of the battery is remarkably steady and uniform, and as the depolarizing substance used is not only itself insoluble in the solution, but gives on decomposition products also insoluble, great durability is secured, for the reason that the zinc is not affected by the permeation of any soluble products through the porous cup. The full dissolving capacity of the liquid being thus preserved, the battery may be made quite small, as but little liquid is required. Other advantages secured by the use of the substances named are that by the decomposition of the oxide, when the battery is active, metallic mercury is formed, which reduces the internal resistance.

I am aware that oxides of various kinds have been used as depolarizing agents in galvanic batteries, and such I do not broadly claim. When, however, the materials herein named are used and applied as specified, very superior results are obtained. The battery gives a very high electro-motive force and is very constant.

What I claim is—

1. A negative electrode for galvanic batteries, consisting of a carbon conductor surrounded or embedded by a mixture of an insoluble depolarizing substance and powdered carbon connected or compacted by the action of an acid or equivalent menstruum, as set forth.

2. A negative electrode for galvanic batteries, consisting of a carbon conductor surrounded or inclosed by a mixture of mercuric oxide and powdered or granulated carbon in a compact mass, as set forth.

3. The combination, in a galvanic battery, of a positive electrode, a solution of sal-ammoniac, a porous cup, and a negative electrode consisting of a conductor of carbon surrounded by or embedded in a mixture of mercuric oxide and carbon, solidified by a suitable acid, as set forth.

4. The method of forming or preparing the negative electrode of a galvanic battery, herein described, by mixing together an insoluble depolarizing substance—such as mercuric oxide and carbon—applying the mixture around a carbon conductor, and compacting the same by a dilute acid, substantially as herein set forth.

In testimony whereof I have hereunto set my hand this 28th day of July, 1883.

ALFRED HAID.

Witnesses:
   W. H. DOGGETT,
   PARKER W. PAGE.